(No Model.) 2 Sheets—Sheet 1.
C. H. ROACH.
MACHINE FOR MAKING GLASS POTS.
No. 367,729. Patented Aug. 2, 1887.
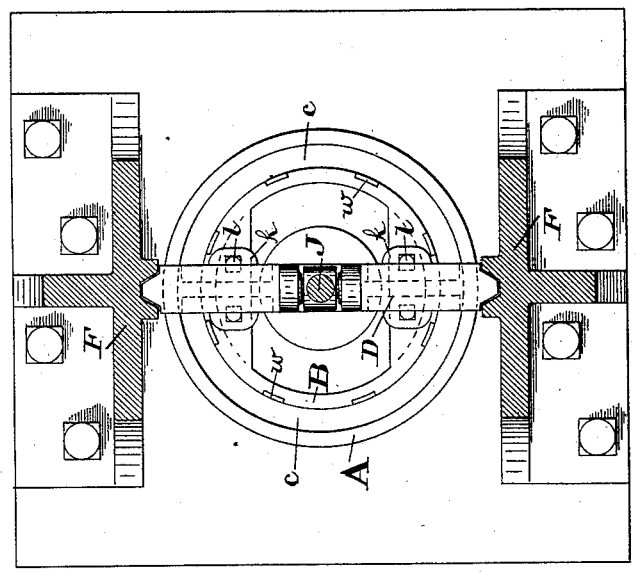
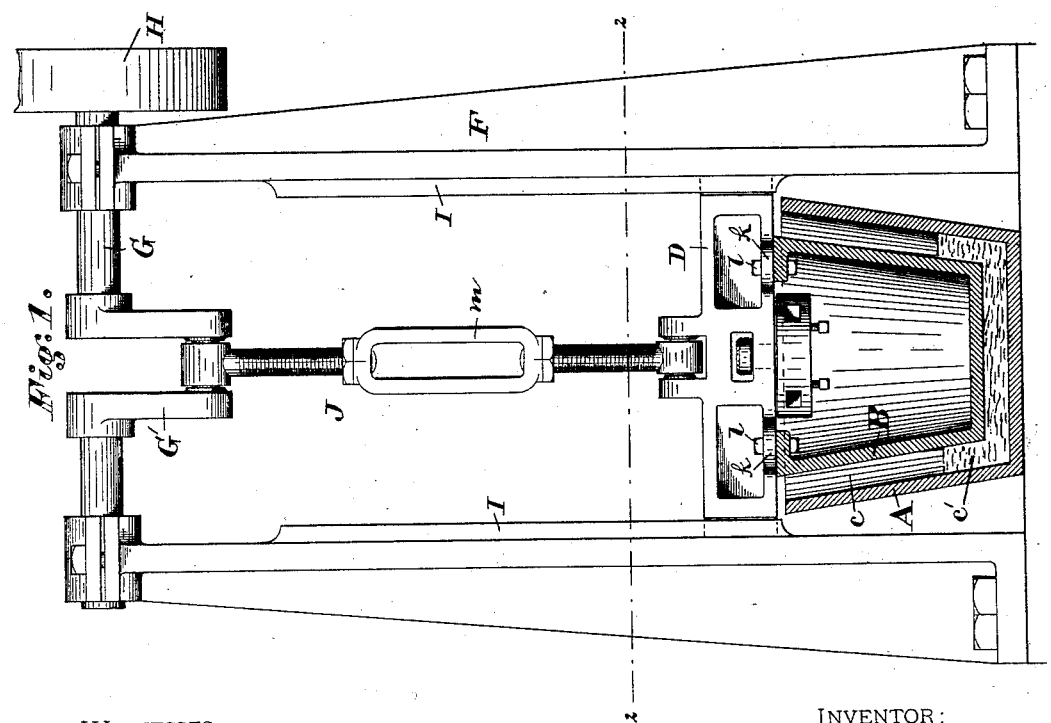
WITNESSES:
J. K. E. Diffenderffer.
John E. Morris
INVENTOR:
C. H. Roach
BY Chas B. Mann
ATTORNEY.

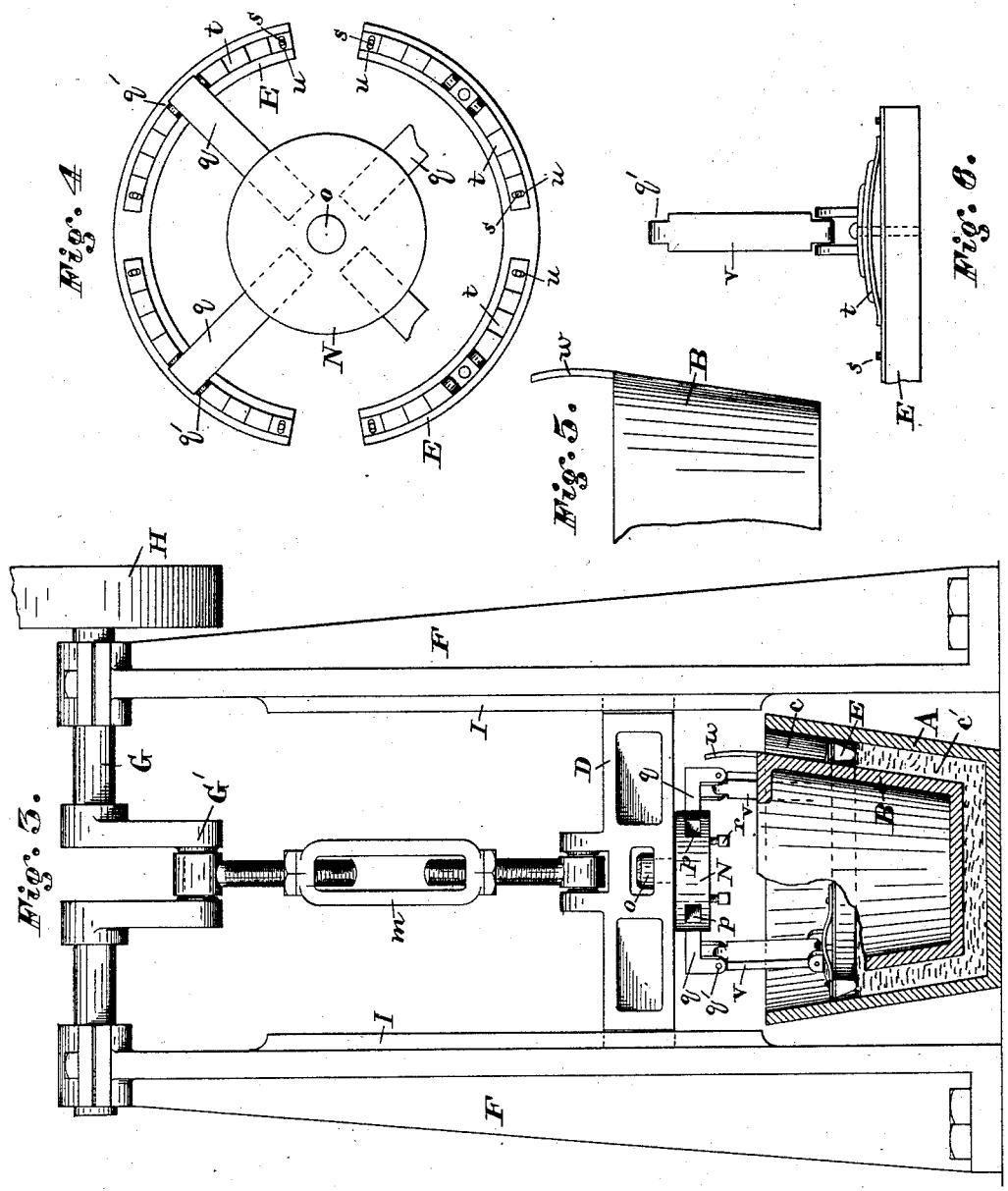

UNITED STATES PATENT OFFICE.

CHARLES H. ROACH, OF BALTIMORE, MARYLAND.

MACHINE FOR MAKING GLASS POTS.

SPECIFICATION forming part of Letters Patent No. 367,729, dated August 2, 1887.

Application filed March 24, 1887. Serial No. 232,250. (No model.)

*To all whom it may concern:*

Be it known that I, CHARLES H. ROACH, a citizen of the United States, residing at Baltimore, in the State of Maryland, have invented certain new and useful Improvements in Machines for Making Glass Pots, of which the following is a specification.

This invention relates to a machine for making clay pots for glass-making, and is illustrated in the accompanying drawings, in which—

Figure 1 is an elevation of the machine, showing the mold and core in the first position. Fig. 2 is a top view of the mold, core, and rammer cross-head, and a horizontal section of the guides on the line 2 2. Fig. 3 is an elevation of the machine, showing the pitman-rod of the rammer shortened, and showing the flexible rammer between the mold and core. Fig. 4 is a top view of the flexible rammer. Fig. 5 is a partial side view of the core, showing one of the curved guides for the rammer. Fig. 6 is a side view of part of the flexible rammer.

The letter A designates a metal or wooden mold having an inner flat bottom, from which the walls rise and flare, or incline outward. This mold gives the outside shape to the clay pot. A metal core, B, has exteriorly a shape corresponding to that of the mold, but is of smaller size. This core determines the shape and size of the inside of the clay pot. The space $c$ between the core and mold receives the clay $c'$, which forms the pot. The machine comprises a rammer cross-head, D, which first presses the core B into the clay placed into the bottom of the mold to form the clay-pot bottom, a flexible rammer, E, to ram the clay which forms the sides of the clay pot, and mechanism to operate the said rammer cross-head and flexible rammer.

Two standards, F, serve to support a crank-shaft, G, which carries a drive-pulley, H, and vertical guides I are on the confronting sides of said standards. Instead of a pulley at the end, the shaft G may have a drive-crank for turning it. An extensible pitman-rod, J, connects the pitman-crank G' with the rammer cross-head D, which latter is movable up and down in the said vertical guides I. The cross-head D has flanges $k$, to which the core B is secured by bolts $l$, or other suitable means which will permit of its ready detachment.

When the core is thus secured to the cross-head, it will be carried up and down by the revolution of the crank-shaft. The pitman-rod J comprises two rods—one right and the other left screw-threaded. One is attached to the crank and the other to the cross-head, and the two are united by a turn-buckle, $m$, which takes on the screw-threads. It will thus be seen the pitman-rod is extensible, and may be shortened or lengthened at will to meet the requirements of the clay filled into the mold A.

The rammer cross-head D carries a swiveled head, N. This head has on top a central pivot-wrist, $o$, which fits and turns in a hole at the under side of the rammer cross-head. By this means the head N hangs from the cross-head, and while carried up and down is free to turn in a horizontal plane. The swiveled head N has four or more radial sockets, $p$, entering at its rim. Each socket is occupied by an arm, $q$, which is retained in position by a set-screw, $r$.

The flexible rammer E consists of two half-circular rings of rubber. A top view of the rammer is shown in Fig. 4 on a larger scale than that seen in Fig. 3. The half-rubber rings are heavy and thick, and are re-enforced on top by curved metal plates $t$, which have cross-slots $u$, and are secured to the rubber by headed pins or bolts $s$ in said cross-slots, whereby the circular form of the rubber may contract or expand to the extent of the length of cross-slot. The metal plates $t$ are bowed up and overlap each other and comprise leaf-plate springs. Each half-ring is suspended from two of the arms $q$ by hanger-rods $v$, which are jointed by a hinge, $q'$, to said arms. These jointed hanger-rods are necessary, in order to afford the required movement of the flexible rammer, which moves up and down in the space $c$ between the core and mold.

The tendency of the flexible half-rings of the rammer is to contract, and thereby they are adapted to fit the smallest or lower part of the space $c$. Their flexibility allows them to expand as they move up to the upper and largest part of said space. The core B has at its top a number of curved guides, $w$, which project above the top rim. When the flexible rammer is drawn up and out of the space $c$, it surrounds these upward-projecting guides, which prevent the said rammer from contracting and guide it on its descent in the space $c$.

In operation the flexible rammer moves up to clear the space $c$. Tempered clay is then placed in the space $c$ and the rammer set in motion. As it moves up and down it may also be turned slowly by the operator placing his hand on the swiveled head N and rotating it. Additional clay is added from time to time and duly rammed, after each additional quantity is placed in, until the pot is finished. As each supply of clay is placed in the space $c$, the pitman-rod J must be shortened to correspond with the quantity of clay added.

When the pot is finished, it is removed from the mold and placed in a kiln to be burned, in the usual manner.

It is obvious that the desired result may be obtained without having the pitman-rod extensible by provision for raising and lowering the mold and core, so as to change the position with respect to the crank-shaft.

The flexible rammer may be made in two or more segments of rings.

Having described my invention, I claim and desire to secure by Letters Patent of the United States—

1. In a machine for making clay pots, the combination of a mold, A, a core, B, smaller than the mold and leaving a space between, a crank-shaft, a flexible rammer to work up and down in said space, and a pitman-rod connecting the crank-shaft and the flexible rammer.

2. In a machine for making clay pots, the combination of mold A, a core, B, smaller than the mold and leaving a space between, a crank-shaft, a flexible rammer to work up and down in said space, and a pitman-rod provided with means for lengthening or shortening it, for the purpose set forth.

3. In a machine for making clay pots, the combination of a mold, A, a core, B, smaller than the mold and leaving a space between, and provided with upward-projecting guides, a crank-shaft, a flexible rammer consisting of partly-circular rings, a pitman-rod, and means, substantially as described, connecting the said flexible rammer with the pitman-rod.

4. In a machine for making clay pots, the combination of a mold, A, a core, B, smaller than the mold and leaving a space between, a crank-shaft, a cross-head, D, a pitman-rod connecting crank-shaft and cross-head, a flexible rammer consisting of segments of rings, and jointed hanger-rods $v$, from which the flexible rammer is suspended.

5. In a machine for making clay pots, the combination of a mold, A, a core, B, smaller than the mold and leaving a space between, a crank-shaft, a cross-head, D, a pitman-rod connecting crank-shaft and cross-head, a swiveled head, N, attached to the cross-head, and a flexible rammer consisting of segments of rings.

6. In a machine for making clay pots, the combination of a mold, A, a core, B, smaller than the mold and leaving a space between, a crank-shaft, and a rammer consisting of rubber made in two or more segments or part-circular rings.

In testimony whereof I affix my signature in the presence of two witnesses.

CHARLES H. ROACH.

Witnesses:
JOHN E. MORRIS,
JNO. T. MADDOX.